United States Patent [19]

Miller

[11] 4,101,174

[45] Jul. 18, 1978

[54] SLURRY CONTROL SYSTEM

[75] Inventor: Thomas R. Miller, Waynesburg, Pa.

[73] Assignee: Continental Oil Company, Ponca City, Okla.

[21] Appl. No.: 781,079

[22] Filed: Mar. 25, 1977

[51] Int. Cl.$^2$ .................... B65G 53/30; B65G 53/66; F16K 31/20

[52] U.S. Cl. ......................................... 302/11; 73/299; 73/322.5; 137/413; 137/428; 302/15

[58] Field of Search ................. 73/305, 307, 311, 317, 73/319, 322, 322.5, 299; 137/409, 413, 428; 302/14, 15

[56] References Cited

U.S. PATENT DOCUMENTS

| | | | |
|---|---|---|---|
| 1,560,361 | 11/1925 | Allen | 302/14 |
| 2,426,930 | 9/1947 | Hicks | 73/305 X |
| 2,836,067 | 5/1958 | Quist | 73/322.5 X |
| 3,638,485 | 2/1972 | Knauth | 73/311 X |
| 3,807,431 | 4/1974 | Svanteson | 137/413 |
| 3,981,541 | 9/1976 | Doerr et al. | 302/11 |
| 3,993,359 | 11/1976 | Sweeney | 302/15 |

*Primary Examiner*—Daniel M. Yasich
*Attorney, Agent, or Firm*—Richard W. Collins

[57] ABSTRACT

A liquid level sensor for determining the fluid level in a container and for controlling a fluid inlet to the container in response to the fluid level therein. The sensor includes a buoyant liquid-filled flexible conduit or liquid-filled hinged pipe member in the container and a pressure transducer responsive to the head pressure of the liquid in the flexible conduit or hinged pipe member.

4 Claims, 4 Drawing Figures

SLURRY CONTROL SYSTEM

BACKGROUND OF THE INVENTION

1. Field of the Invention

This invention relates to liquid level sensors, and more particularly to liquid level sensors for measurement of a liquid level in a container and for controlling a fluid inlet to the container in response to the liquid level therein.

There are many situations where it is desirable to measure and control the liquid level in a container. One such instance which has given rise to the need for the present invention is in the slurry transportation method of removing coal from a coal mine. With the availability of high speed, automatic mining machines and the development of long wall mining techniques, the limiting factor in many coal mining operations has become the ability to transport the coal particles from the mine to the surface. The use of the conventional railway cars and conveyors in many cases cannot keep up with the progress of the coal-cutting machinery, and as a result the mining machines are only utilized for a fraction of their capacity. In an effort to remove this limitation from coal mining operations, slurry transportation systems have been developed in which the coal particles are slurried with a circulating liquid and pumped by high capacity pumps from the interior of the mine to the surface. Slurry-handling systems are presently available which provide the ability to rapidly remove large amounts of coal particles from a mine without the necessity of conveyors and railway cars as were needed using conventional mining techniques. However, even with these high capacity slurry-handling systems, certain problems have arisen due to the space limitations inherent in most mining operations. The volume of slurry required to handle a modern mining operation is of the order of 15,000 or more liters per minute of slurry. Such a high volume slurry operation normally would call for a very large volume feed hopper to smooth out the operation and to protect against emptying of the feed hopper with possible resultant pump damage and other operating difficulties. However, due to the space limitations in an underground mine, the feed hopper size is severely restricted, and this necessitates a particularly sensitive and rapid response for the inlet control to the slurry hopper. Due to the high flow rates, the slurry hopper can be pumped dry in a very short time, sometimes even as quickly as a fraction of a second, such that the need for precise and immediate control is apparent.

The present invention provides a reliable means for accurately and rapidly controlling the inlet flow rate to a slurry hopper of the type used in slurry transportation mining systems.

2. Description of the Prior Art

Numerous float-operated level control devices are available. U.S. Pat. Nos. 3,563,091 and 3,866,470 are exemplary of float-operated level indicators. U.S. Pat. Nos. 3,543,580 and 3,805,613 are exemplary of level indicators comprising flexible members having buoyant means at a free end and internal means responsive to the elevation of the float member to indicate the liquid level in a tank.

The high liquid flow rate and the large volume of coal particles handled by a slurry hopper for a coal transportation system necessitates a separate compartment for the level control to protect the control means for damage due to the coal particles being moved rapidly through the hopper. U.S. Pat. No. 2,564,305 shows a buoyancy responsive device attached to a tank in a separate compartment for protection of the device.

Previously available measurement devices of the types shown in the above-discussed patents have not been suitable for the control of a slurry hopper in a coal slurry transport system. Some success has been had in the past utilizing a sensitive differential pressure cell connected to a protected compartment in fluid communication with a coal slurry hopper. However, even this has been unsatisfactory in that the conduit to the differential pressure cell has tended to plug with coal particles with resultant interference with its operation. Although the use of a pressure transducer such as a sensitive differential pressure cell has been better than alternative mechanical or electrical linkage devices, there has still been a need for an improved level sensor and control system. Such an improved level sensor and control system is provided by the present invention.

SUMMARY OF THE INVENTION

According to the present invention, a buoyant liquid-filled member is disposed in a tank containing a liquid, and the liquid in the buoyant member is in fluid communication with a pressure transducer positioned lower than the liquid level in the tank such that the pressure head of the liquid in the buoyant member is transmitted to the pressure transducer to indicate the liquid level in the tank. The buoyant member can be a float connected by a flexible conduit to the pressure transducer, or it can be simply a length of flexible hose having a float attached to its free end and having its other end connected to the pressure transducer. Alternatively, the buoyant liquid-containing member can be a liquid-filled pipe pivotally connected to the compartment containing the liquid to be measured. The pressure transducer, preferably a sensitive differential pressure cell, can be operatively connected to an inlet control valve controlling liquid to the compartment in response to the liquid level therein.

DESCRIPTION OF THE PREFERRED EMBODIMENTS

Figure 1:
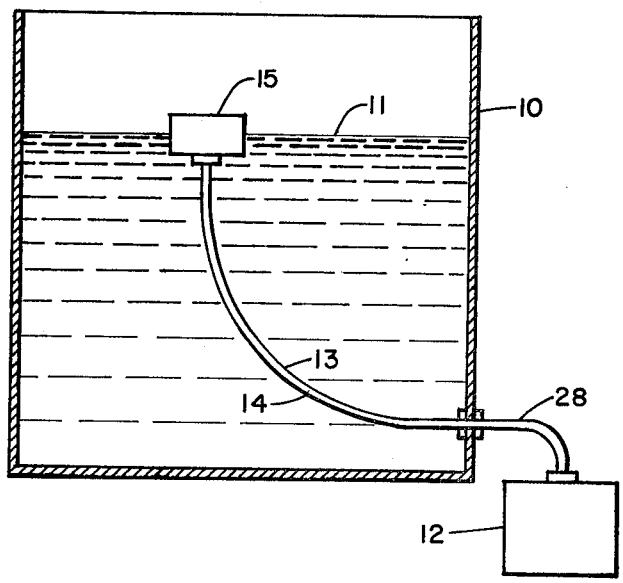
FIG. 1 is a schematic view, partly in section, of a preferred level sensor.
Figure 2:
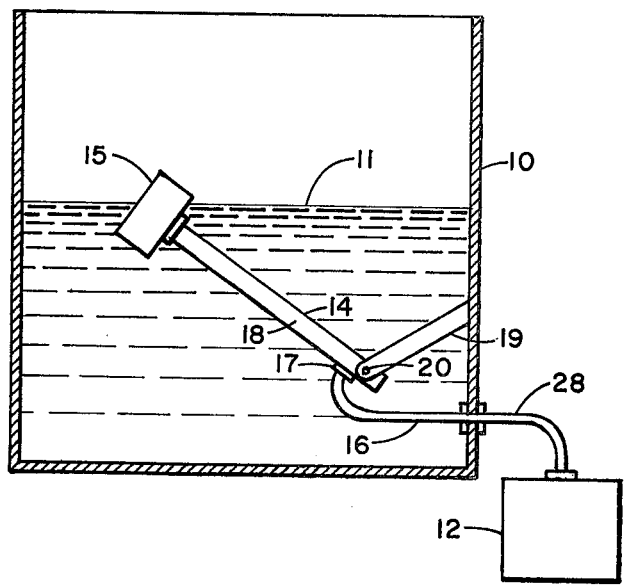
FIG. 2 is a schematic view, partly in section, showing an alternative version of a level sensor.
Figure 3:
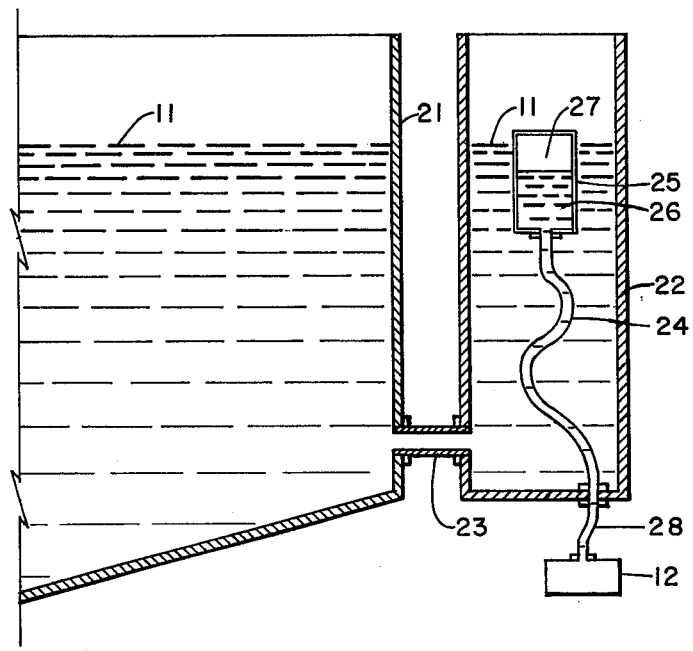
FIG. 3 is a schematic view, partly in section, showing another version of the level sensor and a compartment separated from the main liquid tank.

The liquid level sensor in accordance with the invention may be constructed in a variety of ways. Each of FIGS. 1, 2 and 3 illustrate a different embodiment, but each of the embodiments shown has certain common features. The level sensors of this invention have general utility for sensing the level of a liquid in a confined vessel, and the invention has particular utility in connection with the apparatus illustrated diagrammatically in FIG. 4.

FIG. 1 shows a tank 10 containing a liquid 11. A pressure transducer 12 is connected to tank 10 by conduit 28 and maintained at a fixed elevation relative to tank 10, and a flexible conduit 13 filled with a liquid 14 extends from conduit 28 into the liquid 11 in tank 10. A buoyant float member 15 connected to the free end of flexible conduit 13 maintains the free end of flexible conduit 13 in a fixed position relative to the surface level of fluid 18 in tank 10. Flexible conduit 13 and conduit 28 provide a continuous fluid passage from the free end of conduit 13 to pressure transducer 12 such that the pressure transducer 12 is subjected to pressure determined by the pressure head from the top of the highest position of flexible conduit 13 to the pressure transducer 12. As the level of liquid 11 in tank 10 rises or falls, the pressure head produced by liquid 14 acting on pressure transducer 12 increases or decreases. The liquid 14 in flexible conduit 13 and conduit 28 can be the same or different from the liquid in tank 10, but it is sealed from the liquid 11 so that dirt particles in tank 10 cannot come in contact with pressure transducer 12.

FIG. 2 is an alternative embodiment of a level sensor in accordance with the invention, and includes a tank 10 containing a liquid 11. A pressure transducer 12 is connected to tank 10 through conduit 28, and a flexible line 16 extends from conduit 28 to a coupling 17 joining a pipe 18. Pipe 18, coupling 17, flexible conduit 16 and conduit 28 form a single continuous fluid-containing passage extending from the free end of pipe 18 to pressure transducer 12. A buoyant float member 15 is connected to the free end of pipe 18, and a bracket 19 and pivot 20 connect the other end of pipe 18 in a fixed relation relative to tank 10. As the liquid level in tank 10 rises or falls, the pressure head provided by the liquid 14 in pipe 18 increases or decreases and is transmitted to pressure transducer 12.

FIG. 3 illustrates another variation of the level sensor shown in FIG. 1, and is shown positioned in a compartment 22 connected by passage 23 to a hopper 21 containing a liquid 11. The fluid level in compartment 22 is at the same height as the fluid level in hopper 21, and a float member 25 is partially filled with a liquid 26 which is in fluid communication with pressure transducer 12 through flexible hose 24 and conduit 28. An upper buoyant section 27 of float member 25 provides buoyancy to the unit and rises or falls along with changes in the level of fluid 11 in compartment 22 and hopper 21.

It will be appreciated that numerous variations of the invention, in addition to those illustrated in FIGS. 1 through 3, can be designed utilizing the principles of this invention. The common feature and the essential aspect of the invention is the provision of a column of fluid providing a pressure head acting upon a pressure transducer and varying in accordance with the level of a fluid in a tank.

Figure 4:
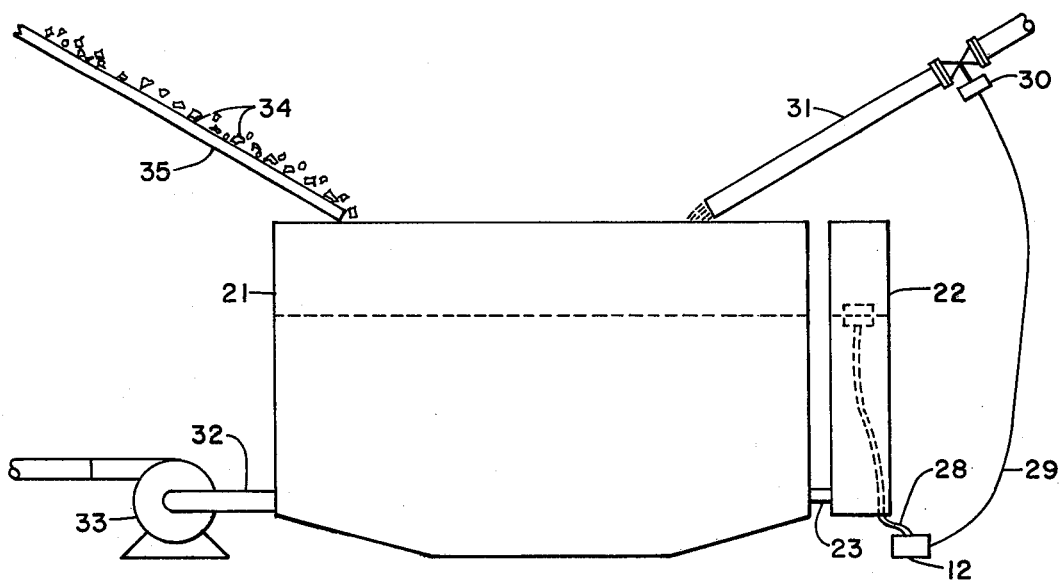
FIG. 4 is a diagram view depicting the preferred manner of using the level sensor of the invention.

A preferred manner of utilizing the level sensor of this invention will now be described with reference to FIG. 4. A slurry hopper 21 is shown with a passage 23 connecting the interior of hopper 21 with the interior of compartment 22. Compartment 22 contains a liquid-filled conduit as described in connection with FIG. 3, and the liquid-filled conduit communicates through conduit 28 with pressure transducer 12. A control lead 29 from pressure transducer 12 to control valve 30 conducts a signal from pressure transducer 12 dependent upon the level of liquid in hopper 21 and compartment 22. The control signal in turn determines the setting of control valve 30 which regulates the flow of liquid through pipe 31 discharging into hopper 21. Coal particles 34 are discharged from conveyor 35 into hopper 21, and the resulting slurry is discharged from hopper 21 through discharge line 32 into slurry pump 33. The slurry is transported by pump 33 to a collecting point (not shown) where coal particles 34 are separated from the liquid, and the liquid is then returned to the hopper 21 completing the circulation loop. The need for a sensitive and accurate control is apparent when it is considered that the hopper 21 in a coal slurry system for transporting coal particles from a mine to the surface may have a volume capacity which is very small compared to the input capacity of the liquid discharge pipe 31. If the slurry pump 33 should become plugged or otherwise malfunction, the slurry hopper 21 would overflow in a matter of seconds without an accurate and rapid manner of controlling the control valve 30. Also, in the event of a surge of coal particles 34, the rate of flow through line 31 must be controlled to compensate for this. The use of a level sensor in accordance with the invention and utilizing a sensitive differential pressure cell as the pressure transducer 12 has proven to be satisfactory for the operation of a coal slurry transportation system, and prior to this invention there was no satisfactory way of controlling the operation. Previous efforts utilizing a sensitive differential pressure cell measuring the height of liquid in compartment 22 were subject to malfunction caused by plugging of the fluid conduit leading to the differential pressure cell, and the present invention provides a means for preventing this problem.

The differential pressure cell may be any of several commercially available models. A suitable model is available from Foxboro, and can be calibrated to provide an output of, for example, from 10 to 50 milliamps over a selected differential pressure range such as from 0 to 20 inches of water. The liquid inside the flexible conduit or pipe which provides the pressure head is preferably water, but can be most any non-corrosive liquid. The output current from the differential pressure cell provides a signal through a process control unit which in turn regulates the setting of the flow control valve.

The foregoing description of specific embodiments of the level sensor and of a specific application thereof are for purposes of illustration, and are not intended to be limiting of the invention. The invention in its broadest form is a liquid level sensor which transmits a pressure head, determined by the elevation of the sensor to a pressure transducer. Many alternative designs and variations in addition to those described in detail above will be apparent to those skilled in the art.

I claim:

1. A slurry handling system for removing coal particles from the interior of a coal mine to the surface comprising:
   (a) a slurry hopper located in the interior of a coal mine;
   (b) a conveyor for feeding coal particles to said hopper;
   (c) a controlled liquid inlet for feeding liquid to said hopper;
   (d) a slurry pump connected to said hopper by a slurry outlet for discharging a slurry of said coal particles and said liquid from said hopper to a collecting point where coal particles may be separated from said liquid;
   (e) a compartment in fluid communication with said hopper;
   (f) a liquid-containing conduit having a first free end positioned in said compartment and adapted to float within said compartment at a level dependent on the level of fluid in said compartment; and (g) a pressure transducer connected to said compartment and responsive to head pressure in said liquid-containing conduit, said pressure transducer being operatively connected to a control valve controlling said controlled liquid inlet to control the amount of said liquid being fed to said hopper in response to the liquid level in said hopper.

2. A slurry transportation system as defined in claim 1 wherein said liquid-containing conduit is a flexible conduit.

3. A slurry transportation system as defined in claim 1 wherein said liquid-containing conduit is a pipe member pivotally mounted inside said compartment whereby said pipe member will pivot and the liquid level in said pipe member will change relative to said compartment upon changing of the fluid level in said compartment.

4. A slurry transportation system as defined in claim 1 wherein said pressure transducer is a differential pressure cell.

* * * * *